March 2, 1943.  A. G. McNICOLL  2,312,842
CLOCK THERMOSTAT
Filed Nov. 16, 1939   3 Sheets-Sheet 1

Inventor
Andrew G. McNicoll
By George H Fisher
Attorney

March 2, 1943.  A. G. McNICOLL  2,312,842
CLOCK THERMOSTAT
Filed Nov. 16, 1939  3 Sheets-Sheet 2

Inventor
Andrew G. McNicoll
By George H. Fisher
Attorney

March 2, 1943.　　　A. G. McNICOLL　　　2,312,842
CLOCK THERMOSTAT
Filed Nov. 16, 1939　　　3 Sheets-Sheet 3

Inventor
Andrew G. McNicoll
By George H. Fisher
Attorney

Patented Mar. 2, 1943

2,312,842

UNITED STATES PATENT OFFICE 2,312,842

CLOCK THERMOSTAT

Andrew G. McNicoll, Minneapolis, Minn., assignor to Minneapolis-Honeywell Regulator Company, Minneapolis, Minn., a corporation of Delaware Application November 16, 1939, Serial No. 304,812

19 Claims. (Cl. 200—139)

This invention relates broadly to thermostatic devices and more particularly to thermostats which are automatically adjusted by means of an electric clock.

One of the main objects of the present invention is to adjust a thermostat by means of a clock whose time indicating means are moved intermittently. Thus the hour indicating means will be moved only once an hour and the actual movement will occur in something less than a minute. Twice a day one of these movements of the hour indicating means will cause it to be connected to the thermostat to adjust it, and at all other times the connection will be broken, whereby the thermostat may be adjusted manually up or down the scale without interference from the clock.

A further object of the invention is to provide the above device with adjustments whereby the hour at which the automatic adjustments are made may be varied and to also provide means to vary the extent of the automatic adjustments in each direction.

Another object is to mount the device upon a horizontally extending base with the motor at one end, the thermostat at the other, and the time indicating and adjusting mechanism between the two. In this manner the thermostat is less apt to be affected by the heat from the motor. The cover will be well ventilated to permit a free flow of air therethrough.

Still another object of the invention is to break the thermostatic element up into two separate pieces of bimetal and mount them on a pivoted bracket. This is done so that the thermostat may be mounted in a smaller space.

Figure 1:
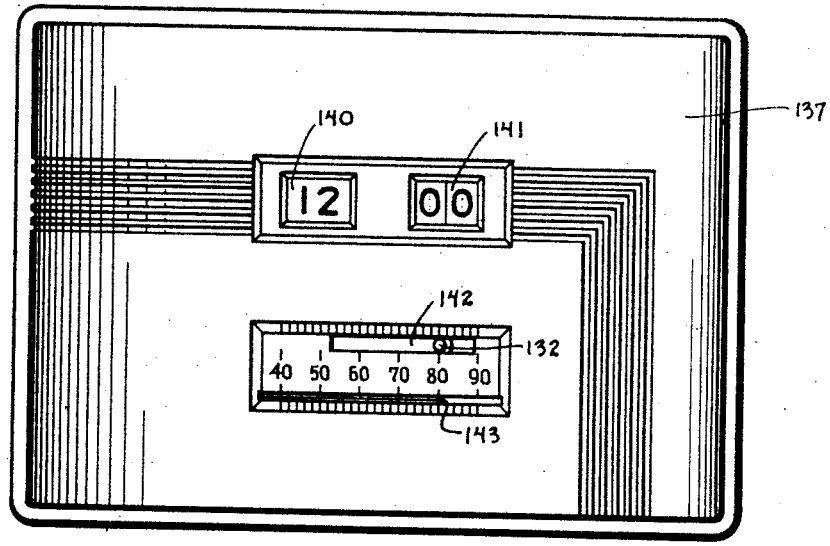
Figure 2:
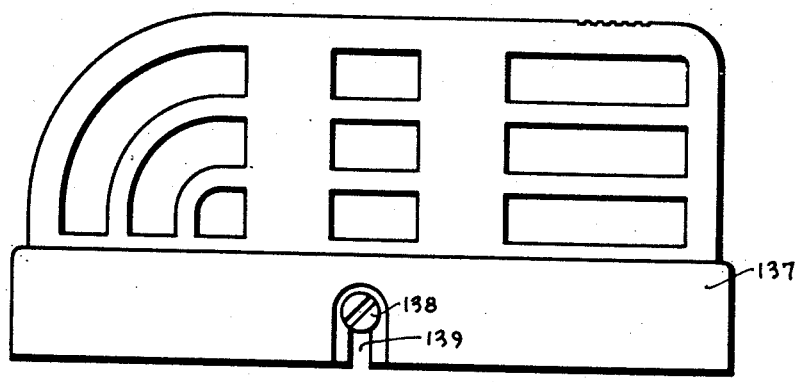
Figure 3:
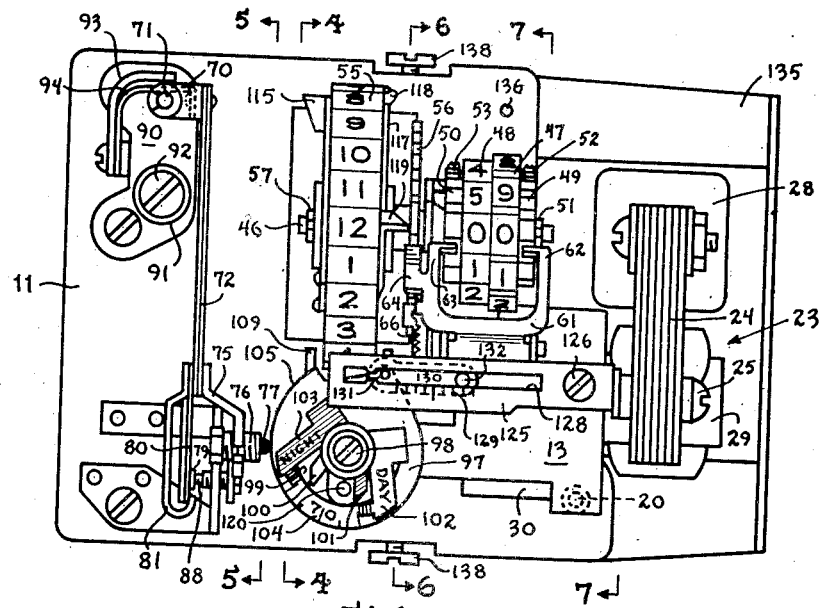
Figure 4:
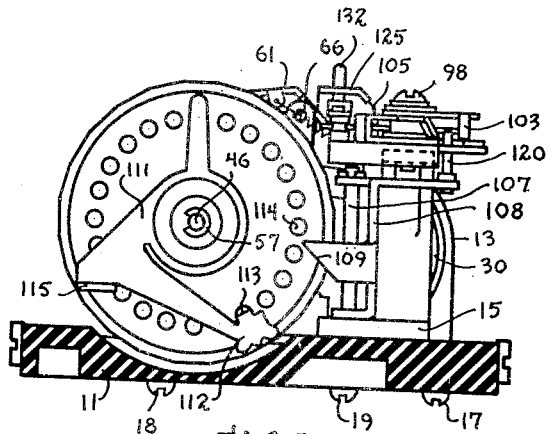
Figure 5:
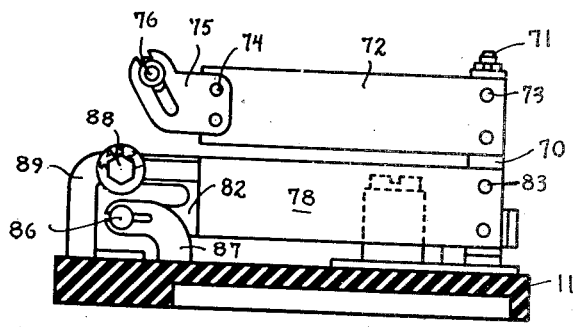
Figure 6:
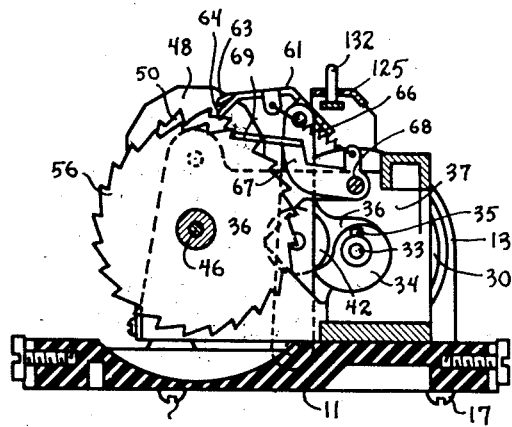
Figure 9:
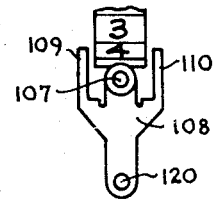
Figure 7:
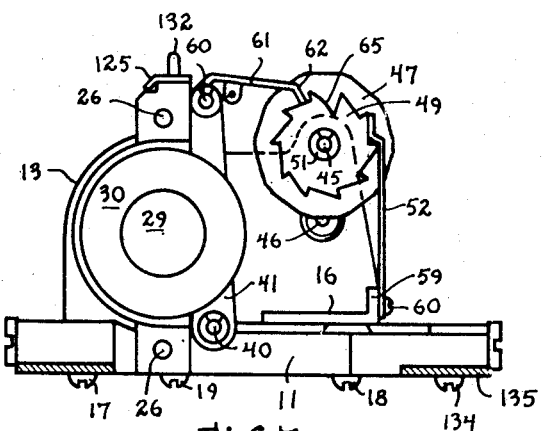
Figure 8:
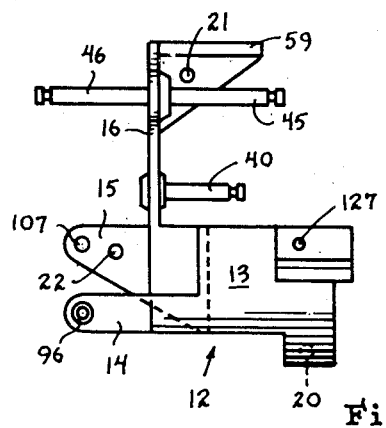

These and other objects will readily become apparent as the following specification is read in the light of the accompanying drawings in which Figure 1 is a front elevation of the device with the cover on, Figure 2 is a view of the bottom of the cover showing the ventilated openings, Figure 3 is a front elevation of the device with the cover removed, Figure 4 is a section taken on the line 4—4 of Figure 3, Figure 5 is a section taken along the line 5—5 of Figure 3, Figure 6 is a section taken along the line 6—6 of Figure 3 showing the pawl and ratchet mechanism in detail, Figure 7 is a detail view of the pawl and ratchet for the minute indicating drum taken along the line 7—7 of Figure 3, Figure 8 is a detail view of the metal casting which supports the clock and adjusting mechanism, and Figure 9 is a view of one element of the adjusting mechanism.

Referring now to the drawings, the insulated base 11 is adapted to support a metal casting indicated generally at 12 and shown in detail in Figure 8. This casting comprises a hollow body 13 and a plurality of legs 14, 15 and 16. The casting is connected to the base by means of screws 17, 18 and 19 which extend through tapped holes 20, 21 and 22 respectively in the casting. The field 24 of a synchronous electric motor 23 is connected to the metal casting by means of screws 25 which extend into the tapped holes 26 in the casting shown in Figure 7. An electrical field winding 28 surrounds a portion of the field and forms the electrical power supply for the motor. The armature 29 is positioned within the field 24, and this armature as well as a gear reduction 30 is entirely enclosed in a metal casing. This motor and gear reduction are of conventional design and form no part of the present invention. The gear reduction 30 is mounted within the hollow body 13 of the metal casting as shown in Figure 3. Extending from the gear reduction 30 is a shaft 33 which carries a cam 34 which is positioned thereon by means of the screw 35. The shaft 33 is seated in a cut away portion 36 in the face 37 of the casting 12.

Pivotally mounted on the axle 40 carried on leg 16 of the casting is a lever 41 which carries a roller 42 cooperating with the cam 34. The leg 16 of the casting 12 carries two additional axles 45 and 46. Mounted on the axle 45 are a pair of drums 47 and 48 each of which is independently rotatable on the axle. Drum 47 is rigidly connected to the ratchet wheel 49 and the drum 48 is rigidly connected with the ratchet wheel 50. A clip 51 is provided on the end of the axle in order to retain these drums in position. It is obvious that rotation of the ratchet wheel 49 will cause a rotation of the drum 47 and rotation of the ratchet wheel 50 will cause rotation of the drum 48. A pair of spring fingers 52 and 53 are provided for positioning the drums during the time when they are not being rotated by the clock motor. These spring fingers are adjustably supported on flange 59 of the casting 13 by means of a pair of screws 60. By adjusting the positoin of the fingers 52 and 53 vertically, as seen in Figure 7, the positions of the drums 47 and 48 may be correspondingly adjusted. The axle 46 rotatably carries a drum 55 which is rigidly connected to the ratchet wheel 56. A clip 57 retains these members on the axle 46.

Pivotally mounted on the upper end of the lever 41 as shown at 60 is an actuating member 61 having three fingers 62, 63, and 64. These fingers are adapted to cooperate with the notches in the ratchet wheels in order to advance the three time indicating drums 47, 48 and 55. Drum 47 is provided with numerals from 0 to 9 for the purpose of indicating the minutes. All of the notches in the ratchet wheel 49 connected to the drum 47 are shallow with the exception of the notch 65 corresponding to the numeral 0. The cam 34 which is mounted on the motor shaft 33 is rotated one revolution per minute by the synchronous motor 23 and the cam is rotated in a counterclockwise direction as seen in Figure 6 so that the lever 41 advances the actuator 61 slowly in a direction to rotate the ratchet wheel 49 and then is quickly retracted by means of the spring 66. Because of the shape of the cam 34 it requires the better part of a minute to advance the actuator or pawl 61 and a very small fraction of that time to retract it. When the finger 62 is at the bottom of one of the shallow notches in the ratchet wheel 49 the fingers 63 and 64 are elevated to a position where they do not engage the ratchet wheels 50 and 56. As the cam 34 rotates and advances the actuator 61 the finger 62 engages one of the teeth formed by the notches in the ratchet wheel 49 and advances the wheel $\frac{1}{10}$ of a revolution which will bring the next succeeding numeral opposite the numeral 0 on drum 48 seen in Figure 3. This action will continue for 9 revolutions of the cam 34 at which time the numeral 9 will be opposite the numeral 0 on the drum 48. At this time the finger 62 will have dropped into the deep notch 65 in the ratchet wheel 49 which will permit the finger 63 to drop into one of the shallow notches in the ratchet 50. This shallow notch in the ratchet 50 however maintains the finger 64 out of engagement with the ratchet wheel 56 and at this time when the actuator 61 is advanced by the cam 34 the fingers 62 and 63 will rotate the drums 47 and 48 until the numeral 1 is moved into the position formerly occupied by the numeral 0 on drum 48 and the drum 47 will be returned to its original position shown in Figure 3.

It will be noticed that the drum 48 has two sets of numerals from 0 to 5 and this drum indicates the 10 minute intervals. The position now assumed by the two drums will therefore give an indication of 10 which, if the hour drum 55 is in the position shown, will indicate 10 minutes after 12. As the actuator 61 is withdrawn it again falls into a shallow notch in the ratchet 49 and therefore the finger 63 is again moved out of engagement with the ratchet wheel 50. Continued advancement and retraction of the actuator 61 will keep rotating the drum 47 until the numeral 9 occupies the position now occupied by the numeral 0 at which time the finger 62 will again drop into the deep notch in ratchet wheel 49 and the next time the actuator 61 is advanced it will advance the drum 48 $\frac{1}{12}$ of a revolution and the drums will then indicate a time of 12:20.

This action will be repeated until 12:59 at which time the finger 62 will again drop into the deep notch in the ratchet wheel 49 and the finger 63 will drop into one of the two deep notches in the ratchet wheel 50. This will permit the finger 64 to engage the ratchet wheel 56 and as the actuator 61 advances this time it will rotate all three of the time indicating drums and move them to a position where they will indicate a time of 1 o'clock. It can be seen that the hour drum 55 is provided with two sets of twelve numerals and therefore is rotated $\frac{1}{24}$ of a revolution each time it is rotated by the actuator 61. The deep notches in the ratchet wheels 49 and 50 have curved surfaces so that fingers 62 and 63 may be more easily retracted.

As stated above the spring fingers 52 and 53 position the drums 47 and 48 and prevent them from turning while the actuator 61 is being retracted. The ratchet 56 for drum 55 is provided with a pawl 67 which is pivoted to the face 37 of the casting 12 and shown at 68 and has a finger 69 which prevents the rotation of the drum 55 as the actuator 61 is retracted. The spring 66 is connected between the actuator 61 and the pawl 67 and biases both of these members into engagement with their respective ratchet wheels.

It will be seen that the mechanism just described is a clock of the cyclometer type in which the hour indicating drum is rotated completely every twenty-four hours. In order to differentiate between the numerals corresponding to the daytime and the numerals corresponding to the night-time on the hour indicating drum the former take the form of black numerals on a white background and the latter take the form of white numerals on black background. In this case the daytime is considered to be from 6 o'clock in the morning to 6 o'clock at night.

At the opposite end of the base from the motor 29 is a bracket 70 which is pivotally mounted on an axle 71 rigidly connected to the base 11. A first bimetallic blade 72 is connected to the bracket 70 in any suitable manner such as the rivets 73. The other end of this blade is connected by rivets 74 to an arm 75 in which a screw 76 is adjustably mounted, this screw having an insulating tip 77. A second bimetallic blade 78 is riveted to the bracket 70 as shown at 83. The other end of blade 78 carries a movable contact 79 which is mounted on a press back blade 80 which forcibly engages a stop member 81 in order that the blade may be given an initial tension. The blade 78 carries a second movable contact (not shown) which is located on the end of the arm 82 shown in Figure 5 for the purpose of cooperating with a stationary contact 86 adjustably mounted in bracket 87 carried by the base 11. Movable contact 79 is adapted to cooperate with stationary contact 88 adjustably carried in bracket 89 mounted on the base 11. The two movable contacts and stationary contacts are so adjusted that contacts 79 and 88 will engage first and at a slightly lower temperature the other two contacts will engage.

Mounted on the plate 90 is a metal shell 91 carrying an electric heater plug 92. The details of this arrangement form no part of the present invention and for a more detailed description thereof reference may be had to the Kronmiller and Malone Patent 2,171,272. A metallic spring 94 is connected between the plate 90 and a bracket 70 for the purpose of establishing a good electrical connection between the plate and the bimetallic thermostat and also for biasing the bracket 70 for rotation in a counter-clockwise direction for a purpose which will appear later on in the description. A guard 93 is provided for the purpose of protecting spring 94 when the instrument is handled.

Rotatably mounted on the pin 96 on arm 14 of the casting 12 as seen in Figure 8 is a cam 97 which is retained thereon by means of the screw 98. This cam is provided with an opening 99 and a pair of adjustable fingers 100 and 101. These fingers are mounted concentrically with the pin 96 and the finger 100 is provided with an adjusting arm 102 and the finger 101 provided with an adjusting arm 103. A scale 104 is provided around the circumference of the cam 97 for cooperation with the two arms 102 and 103. The cam 97 has a cam surface 105 against which the insulating tip 77 of the screw 76 is held by means of the spring 94. It will thus be seen that by rotating the cam member 97, the position of the thermostatic blades 72 and 78 will be varied by reason of the cooperation of the screw 76 with the cam surface 105.

It might be pointed out at this time that by arranging the two blades 72 and 78 in the manner shown the thermostat has an effective length which is equal to the sum of the lengths of the two blades. The free end of the blade 72 is fixed by its engagement with the cam surface 105 and as the blade 72 warps in response to an increase in temperature it will rotate the bracket 70 in a clockwise direction due to the fact that the active side of the blade 72 is away from the clock mechanism. Rotating the bracket 70 in a clockwise direction will move the free end of the blade 78 in a direction to separate the contacts. The active side of the blade 78 is toward the clock mechanism and therefore as this blade warps due to an increase in temperature it will also move its free end in a direction to separate the contacts. It can be seen that the effects of these two blades are cumulative and the total movement of the free end of the blade 78 is the same as if a single blade were used of a length equal to the sum of the lengths of the two blades 72 and 78.

Pivotally mounted on the axle 107 is an adjusting member 108 shown in Figures 4 and 9. This member has a pair of identical cam shaped fingers 109 and 110 which extend on either side of the hour indicating drum 55. As seen in Figure 4 the hour indicating drum is provided with a member 111 which is mounted on the axle 46 and is rotatable with respect thereto. The member 111 is provided with an adjusting finger 112 which has a projection 113 which extends through any one of a series of 24 holes 114 in the drum 55 so that the member 111 may be given a position about this wheel 55 corresponding to any one of the 24 hours. The member 111 is also provided with an extension 115 which is adapted to engage the cam surface on the arm 109 of the adjusting member 108 as the wheel 555 is rotated by the clock mechanism.

Let it be assumed that the arm 112 is pulled outwardly to remove the finger 113 from the hole 114 and that the member 111 is then rotated with respect to the drum 55 until the arm 112 is opposite the numeral 10 corresponding to the night time and the finger 113 is then permitted to enter the corresponding hole 114 in order to fix the member 111 with respect to the drum 55. This means that when the drum 55 is rotated to a position to where it indicates 9 o'clock the extension 115 has reached a position just below the cam surface 109. At 10 o'clock the actuator 61 rotates the drum 55 $\frac{1}{24}$ of a revolution at which time the extension 115 will engage the arm 109 and rotate it until the extension 115 has just cleared this arm. This will rotate the adjusting member 108 to a definite position in a counter-clockwise direction.

The opposite side of the drum 55 is provided with actuator member 117 rotatably mounted on the axle 46, the member 117 being an exact duplicate of the member 111 just described. This member is provided with an adjusting arm 118 and an extension 119 which is adapted to cooperate with the arm 110 on the adjusting member 108. If the adjusting arm 118 were set opposite the numeral 7 corresponding to the daytime the extension 119 would be moved just below the arm 110 when the drum 55 moved to indicate 6 o'clock in the morning. When the actuator 61 rotates this drum to indicate 7 o'clock the extension 119 will engage the arm 110 and rotate the adjusting member 108 in a clockwise direction as seen in Figure 9 until this extension just clears the arm 110.

Thus it will be seen that at 10 o'clock at night the adjusting member 108 will be rotated to a definite position and at 7 o'clock in the morning the member will be rotated back to its original position. The member 108 is provided with a pin 120 which extends upwardly between the two fingers 100 and 101 as seen in Figure 3. Therefore as the adjusting member 108 is rotated in a clockwise direction the pin 120 will engage the finger 100 and rotate the cam 97 in a clockwise direction which will permit the screw 76 to slide down the low side of the cam surface 105 which will permit the bracket 70 to be rotated in a counter-clockwise direction thereby raising the setting of the thermostat. The finger 100 is adjusted by the arm 102 marked day and the position of the finger 100 about the pin 96 determines the extent to which the cam 97 may be rotated by means of the adjusting member 108. Therefore the position of this finger 100 determines the temperature to which the thermostat will be set. The scale 104 is so calibrated that if the finger 102 points to the numeral 70 the thermostat will be set to 70 by the adjusting member 108 at 7 o'clock in the morning as this adjusting member is rotated in a clockwise direction by the extension 119. By moving the finger 102 toward the right as seen in Figure 3 the temperature setting will be raised because the pin 120 on the adjusting member 108 will engage the finger 100 sooner and therefore rotate the cam 97 further. Likewise the position of the finger 103 which adjusts the position of the finger 101 determines the temperature to which the thermostat will be set at night when the extension 115 rotates the adjusting member 108 in a counter-clockwise direction at which time the pin 120 will rotate the cam 97 through its cooperation with the finger 101.

The arm 125 is supported by means of the screw 126 which enters the tapped hole 127 in the metal casting 12. This arm is provided with an elongated slot 128 and a scale 129. A link 130 is pivotally connected to the cam 97 as shown at 131 and has a pin 132 which extends through the slot 128. The cam 97 may be manually rotated by moving the pin 132 back and forth along the slot 128. This obviously provides for a manual adjustment of the thermostat.

One of the advantageous features of this construction is that the thermostat may be manually adjusted either up or down the scale at any time except when the thermostat is actually being adjusted by means of the clock mechanism. For example at 9 o'clock at night the adjusting member 108 is in its clockwise position and the extension 115 is located immediately below the arm 109 on the adjusting member. At this time the pin 132 may be moved the entire length of the slot 128 to rotate the cam 97 which through the fingers 100 and 101 will also rotate the adjusting member 108. The extension 115 and arm 109 are so positioned that the rotation of the member 108 is permitted freely without any interference from them. At 10 o'clock the actuator 61 rotates the drum 55 and the extension 115 engages the arm 109 and rotates the adjusting member 108 to its counter-clockwise position. Before the drum 55 stops moving the extension 115 has completely cleared the arm 109 and after this clearance has taken place the cam 97 and the adjusting member 108 are perfectly free to be rotated manually to increase or decrease the temperature value to which the thermostat is set without interference from the arm 109 and the extension 115. The same thing is true of the extension 119 and the arm 110 with regard to the daytime adjustment of the thermostat. It will therefore be seen that the thermostat may be manually adjusted at any time with the exception of a one minute interval twice a day and that this manual adjustment will in no way affect the time or the extent of either of the automatic adjustments made by the clock mechanism. Moreover it is seen that it is quite simple to change the time of either the daytime or the night time adjustment by rotating either of the members 111 or 117 with respect to the hour drum. This device also provides a very easy and simple adjustment of the temperatures to which the thermostat is automatically set by manipulating the adjusting arms 102 and 103 on the adjusting cam 97.

A U-shaped member 135 is connected to the base 11 by means of a bolt 134 extending into a tapped hole 136 in the base and also by means of the bolt 17 which is used to fasten the casting 12 to the base. The purpose of this member 135 is to form a guard for the motor 23 and to aid in positioning the cover 137 on the base. This cover is inserted over the mechanism and is retained thereon by means of the screws 138 which enter tapped holes in the base 11 and are received in the slots 139 in the cover 137. It will be seen in Figure 2 that the top and bottom of the cover are well ventilated to permit a free flow of air therethrough. The heat of the electric motor 23 will cause a passage of air through the right hand side of the casing which will aid materially in dissipating the heat and it will thus have a minimum effect on the bimetallic blades 72 and 76. The cover 137 is provided with a pair of windows 140 and 141, the numerals on the hour indicating drum 155 being visible through the window 140 and the numerals on the ten minute and minute drums 48 and 47 being visible through the window 141. The cover is further provided with a slot 142 through which the manual adjusting pin 132 extends so that the thermostat may be manually adjusted without removing the cover. Immediately below this slot is an indicating thermometer 143 and in this case a single scale is provided for cooperation with the manual adjusting pin 132 and the indicating thermometer 143. It will be appreciated that as the thermostat is adjusted by means of the clock through the rotation of the cam 97 that the pin 132 will also be moved and therefore this member is an indicator of the temperature to which the thermostat is adjusted regardless of whether the thermostat has been adjusted manually or automatically by the clock.

Various changes and modifications of this invention will doubtless occurs to those who are skilled in the art and for this reason I wish it to be understood that I am to be limited only by the scope of the appended claims and not by the specific embodiment disclosed.

I claim as my invention:

1. In a device of the character described, a synchronous motor, time indicating means including an hour indicating member, connections between the hour indicating member and the motor whereby the latter moves the former once every hour, a thermostat, an adjusting member fixed with respect to said hour indicating member, means for operatively connecting said adjusting member to said thermostat at a predetermined hour each day for adjusting it during movement of said hour indicating member, and manual means for adjusting said thermostat in either direction at any time except during its actual adjustment by said adjusting member.

2. In a device of the character described, a synchronous motor, time indicating means comprising hour, ten minute, and minute indicating drums, pawl and ratchet mechanism for rotating said minute drum $\tfrac{1}{6}$ revolution once a minute, said ten minute drum $\tfrac{1}{12}$ revolution once every ten minutes, and said hour drum $\tfrac{1}{24}$ revolution once every hour, a cam rotated by said synchronous motor once every minute for advancing and retracting said pawl, said cam being so shaped as to slowly advance said pawl to rotate said drums and to quickly retract said pawl, a thermostat, and means actuated by said hour indicating drum for adjusting said thermostat.

3. In a device of the character described, time indicating means including a member for indicating the hour, a synchronous motor for rotating said member $\tfrac{1}{24}$ revolution once every hour, a rotatably mounted cam, a thermostat adapted to be adjusted by said cam, first and second elements on said hour indicating member, and means including said elements for transmitting positioning forces directly from said member to said cam so as to rotate said cam in one direction at one hour and in the other direction at another hour.

4. In a device of the character described, time indicating means including a member for indicating the hour, a synchronous motor for rotating said member $\tfrac{1}{24}$ revolution once every hour, a rotatably mounted cam, a thermostat adapted to be adjusted by said cam, first and second elements on said hour indicating member, connections whereby said first element rotates said cam in one direction at one hour and said second element rotates said cam in the other direction at another hour, and manual means for adjusting said thermostat, said elements engaging said connections only at such times as they are actually rotating said cam, whereby at all other times said thermostat may be set at a higher or lower temperature value by said manual means.

5. In a device of the character described, time indicating means including a member for indicating the hour, a synchronous motor for rotating said member $\tfrac{1}{24}$ revolution once every hour, a rotatably mounted cam, a thermostat adapted to be adjusted by said cam, first and second elements on said hour indicating member, connections whereby said first element rotates said cam in one direction at one hour and said second element rotates said cam in the other direction at another hour, and means in said connections for varying the temperature values to which said thermostat is adjusted by the elements on said hour indicating members.

6. In a device of the character described, time indicating means including a member for indicating the hour, a synchronous motor for rotating said member 1/24 revolution once every hour, a rotatably mounted cam, a thermostat adapted to be adjusted by said cam, first and second elements on said hour indicating member, a pivotally mounted adjusting member rotated in one direction by the first element at one hour and in the other direction by the second element at another hour, a lost motion connection between said adjusting member and said cam, and means for adjusting each limit of said lost motion whereby the temperature value at which said thermostat is adjusted by the elements on said hour indicating member may be varied.

7. In a device of the character described, time indicating means including a member for indicating the hour, a synchronous motor for rotating said member 1/24 revolution once every hour, a rotatably mounted cam, a thermostat adapted to be adjusted by said cam, first and second elements on said hour indicating member, a pivotally mounted adjusting member rotated in one direction by the first element at one hour and in the other direction by the second element at another hour, a lost motion connection between said adjusting member and said cam, means for adjusting each limit of said lost motion whereby the temperature value at which said thermostat is adjusted by the elements on said hour indicating member may be varied, said last mentioned adjusting means comprising a pair of rotatably mounted fingers, and a scale cooperating with said fingers to indicate the temperature value at which the thermostat will be automatically set.

8. In a device of the character described, an elongated base, a synchronous motor mounted on said base at one end, a bracket pivotally mounted at the other end of said base, a thermostat comprising a first bimetallic blade fixed at one end to said bracket and carrying switching mechanism at the other end, and a second bimetallic blade fixed at one end to said bracket, the high expansion side of said blades being reversed with respect to each other, a cyclometer type of clock mechanism including a plurality of time indicating drums mounted on said base between said motor and thermostat, and means operated by said clock mechanism for adjusting said thermostat at predetermined times during the day by moving the other end of said second bimetallic blade.

9. In a clock operated thermostatic device, in combination, a thermostat comprising a first bimetallic blade, a pivotally mounted bracket, one end of said blade being connected to said bracket, a control device adapted to be operated by the other end of said blade, a second bimetallic blade connected at one end to said bracket, the high expansion of said bimetallic blades being reversed with respect to each other, and means for moving the other end of said second bimetallic blade in order to adjust the temperature value at which said thermostat is set.

10. In a device of the character described, an elongated base adapted to be mounted against a wall with its long dimension horizontal, a synchronous motor mounted on said base at one end, a thermostat mounted on said base at the other end, a cyclometer type of clock mechanism including a plurality of time indicating drums mounted on said base between said motor and thermostat, means operated by said clock mechanism for adjusting said thermostat at predetermined times during the day, and a cover for said base, said cover being ventilated to permit a vertical flow of air past said thermostat and motor, said drums serving to separate the air flowing past the motor from the air flowing past the thermostat, thereby tending to prevent transfer of heat from the motor to the thermostat.

11. In a device of the character described, a thermostat, movable means for adjusting the temperature setting of said thermostat, an element movable along a path transverse to the path of said adjusting means, time-controlled means for moving said element into the path of said adjusting means at a predetermined hour so as to position said adjusting means and set said thermostat, means for varying the position of said element relative to said time-controlled means, said time-controlled means moving said element out of the path of said adjusting means immediately after completion of said positioning so as to permit free movement of said adjusting means, and manual means for moving said adjusting means.

12. In a device of the character described, time-indicating means including a member for indicating the hour, a synchronous motor for rotating said member 1/24 revolution once every hour, a rotatably mounted cam, a thermostat adapted to be adjusted by said cam, first and second elements on said hour indicating member, connections whereby said first element rotates said cam in one direction at one hour and said second element rotates said cam in the other direction at another hour, said elements engaging said connections only at such times as they are actually rotating said cam, whereby at all other times said cam is free to move, a casing for said time-indicating means and said thermostat having an opening for displaying said time-indicating means, a second opening and a scale adjacent said second opening, and manual means for rotating said cam including a member projecting through said second opening so as to indicate on said scale the temperature setting of said thermostat.

13. A thermostatic switch, comprising in combination, a pivotally mounted bracket, a pair of bimetallic elements, each element attached at one end to said bracket, said elements being positioned side by side on said bracket and extending laterally therefrom, the high expansion portions of said elements being reversed with respect to each other, a switch contact operated by the other end of one of said pair of elements, and means for moving the other end of the second of said pair of elements in order to adjust the temperature value at which said thermostat is set.

14. A thermostatic switch, comprising in combination, a pivoted supporting member, means biasing said member for rotation about said pivot, a pair of bimetallic elements, each element having one end attached to said member, a fixed switch contact engageable by the other end of one of said elements, and stop means for engaging the other end of the second of said elements so as to limit rotation of said bracket by said biasing means, said elements having their high expansion portions reversed with respect to each other so that a change in temperature in a given direction causes a deflection of the other end of said one element substantially equal to the sum of the deflections of the elements individually.

15. In a device of the class described, constant speed motor means, means intermittently actuated thereby for indicating the time of day, a thermostat, means for adjusting the temperature setting of said thermostat, a member movable with said time indicating means and engageable with a portion of said adjusting means, said member being effective during a single predetermined intermittent actuation of said time indicating means to engage said portion of said adjusting means, to drive said adjusting means to a predetermined temperature setting, and to disengage said portion, and manual means operable to change the setting of said adjusting means at all times except when said member is engaging said portion.

16. In a device of the class described, constant speed motor means, a display device rotated thereby for indicating the time of day, connections between said device and said motor means whereby the motor means drives the device through a predetermined part of a revolution in a predetermined time, a thermostat, means for adjusting the temperature setting of said thermostat, a member movable with said time indicating means and engageable with a portion of said adjusting means, said member being effective during a movement of said time indicating means through one of said predetermined parts of a revolution sequentially to engage said portion of said adjusting means, to drive said adjusting means to a predetermined temperature setting and to disengage said portion, and manual means operable to change the setting of said adjusting means at all times except when said member is engaging said portion.

17. In a device of the character described, a synchronous motor, a twenty-four hour drum rotated $\frac{1}{24}$ revolution thereby once every hour, a condition responsive control device comprising relatively movable and stationary control elements, a connection including a member rotated by said drum for transmitting a positioning force from said drum to one of said elements at a predetermined hour in order to vary the relative positions of said elements, and means in said connection whereby the position of said one element determined by operation of said member may be varied.

18. In a device of the character described, a synchronous motor, a twenty-four hour drum rotated $\frac{1}{24}$ revolution thereby once every hour, a condition responsive control device comprising relatively movable and stationary control elements and connections including first and second members rotated by said drum for transmitting positioning forces from said drum to one of said elements, said first member acting through said connections to move said one element in a predetermined sense, and said second member acting through said connections to move said one element in an opposite sense.

19. In a device of the character described, a synchronous motor, a twenty-four hour drum rotated $\frac{1}{24}$ revolution thereby once every hour, a condition responsive control device comprising relatively movable and stationary control elements, connections including first and second members rotated by said drum for transmitting positioning forces from said drum to one of said elements, said first member acting through said connections to move said one element in a predetermined sense and said second member acting through said connections to move said one element in an opposite sense, and means in said connections whereby the positions of said one element determined by operation of said members may be varied.

ANDREW G. McNICOLL.